455-278 SR

8/31/82 XR 4,347,627

United States Patent [19]

Alter

[11] 4,347,627

[45] Aug. 31, 1982

[54] ADAPTIVE ARRAY PROCESSOR AND PROCESSING METHOD FOR COMMUNICATION SYSTEM

[75] Inventor: Larry D. Alter, Treasure Island, Fla.

[73] Assignee: E-Systems, Inc., Dallas, Tex.

[21] Appl. No.: 15,232

[22] Filed: Feb. 26, 1979

[51] Int. Cl.$^3$ .......... H04B 7/08

[52] U.S. Cl. .......... 455/136; 455/139; 455/278

[58] Field of Search .......... 455/52, 65, 67, 135, 455/136, 137, 138, 139, 273, 276, 278, 283, 295, 303; 343/100 CL

[56] References Cited

U.S. PATENT DOCUMENTS

| | | | |
|---|---|---|---|
| 2,951,152 | 8/1960 | Sichak | 455/139 |
| 3,013,150 | 12/1961 | Gutleber | 455/275 |
| 3,242,430 | 3/1966 | Ghose | 455/260 |
| 3,251,062 | 5/1966 | Ghose | 343/100 CL |
| 3,311,832 | 3/1967 | Schrader | 455/316 |
| 3,348,152 | 10/1967 | Laughlin | 455/139 |
| 3,383,599 | 5/1968 | Miyagi | 455/137 |
| 3,743,941 | 7/1973 | Gans | 455/141 |
| 3,798,547 | 3/1974 | Reudink | 455/137 |
| 3,835,392 | 9/1974 | Mahner | 455/138 |
| 3,879,664 | 4/1975 | Monsen | 455/138 |
| 3,965,422 | 6/1976 | Tagliaferri | 455/138 |
| 4,017,859 | 4/1977 | Medwin | 343/100 CL |
| 4,027,247 | 3/1977 | Aranguren | 455/138 |
| 4,028,697 | 6/1977 | Albanese | 343/5 R |

*Primary Examiner*—Tommy P. Chin

*Attorney, Agent, or Firm*—Robert V. Wilder; Albert M. Crowder, Jr.

[57] ABSTRACT

A processing circuit (50) in a communication system performs multi-channel adaptive array processing using a summed reference technique. A plurality of adaptive modules (56 and 58) modify the magnitude and phase of antenna element signals from a plurality of antenna elements. The outputs of the adaptive modules are combined by a combiner (60) to produce a summation signal. A modem (64) processes and divides the summation signal into a plurality of reference channel signals on channels 1 through K. A summer (70) adds the reference channel signals together to produce a composite reference signal that is subtracted by a subtractor (74) from the summation signal to produce an error signal. The error signal is applied to the adaptive modules (56 and 58) which respond to nullify interfering and noise signals and to enhance the signal-to-interference ratio for the summation signal.

4 Claims, 2 Drawing Figures

ADAPTIVE ARRAY PROCESSOR AND PROCESSING METHOD FOR COMMUNICATION SYSTEM

TECHNICAL FIELD

The present invention relates to processors for use with multiple element antennas, and particularly relates to an adaptive array processor for processing signals from a multiple element antenna using a summed reference signal to provide multiple channel capability, with a single adaptive module per antenna element.

BACKGROUND OF THE INVENTION

It is known to use adaptive array processors in association with multiple element antennas to null directional interference and optimize signal gain. For example, an adaptive array processor of this type is described in an article entitled *Experimental Four Element Adaptive Array* by Ralph T. Compton, Jr. in the September, 1976 edition of IEEE, Transactions on Antennas and Propagation. Conventional adaptive arrays have used separate parallel adaptive array processors for each antenna element. In such conventional construction, each adaptive array processor included one adaptive module of each channel of the communication system. Thus, conventional adaptive arrays require a number of adaptive processors equal to the number of antenna elements and require a total number of adaptive modules equal to the number of antenna elements multiplied by the number of channels in the communications system. Typically, in a conventional communications system, a received signal from each antenna element is split into channels and each channel signal is processed by a separate adaptive module. Thus, one module is connected to each antenna element to process one particular channel signal. The outputs of the adaptive modules receiving the same channel signal but connected to different antenna elements are combined to generate an array output for that particular channel. A reference signal is subtracted from the array output to generate an error signal which is applied to control each adaptive module for the particular channel. The adaptive modules adjust to null interference signals thus optimizing the desired signal to interference ratio.

Although conventional adaptive array processors have performed adequately, such conventional processor designs have required unnecessary duplicity of hardware components resulting in undue expense and bulk to process multiple channel signals. A need has arisen for an adaptive array processor having less hardware to reduce bulk and expense over the conventional designs.

DISCLOSURE OF THE INVENTION

The present invention reduces the bulk and expense of adaptive array processors relative to known conventional processors by eliminating the need for a separate adaptive module for each channel signal of each antenna element. Instead, a single adaptive array processor is used having one separate adaptive module for each antenna element in the communication system, and a single multichannel reference signal is used to control the adaptive modules in the processor.

In accordance with the present invention, an adaptive array processor for nulling directional interference and optimizing gain for received signals is used in a multichannel communications system having a plurality of antenna elements for producing antenna element signals. A plurality of adaptive modules are connected to the antenna elements with only one separate adaptive module being connected to each antenna element. The adaptive modules modify the magnitude and phase of the antenna element signals to produce processed signals. A control device receives the processed signals from the adaptive modules and produces a control signal proportional to the overall interference signal level in the processed signals. The control signal is applied to the adaptive modules that respond thereto to null interfering signals received on the antenna elements and to enhance the overall signal-to-interference ratio of the processed signals, whereby the combination or summation of all of the processed signals results in a signal having a greater signal-to-interference noise ratio than the combination of all of the antenna element signals.

A combiner is provided for combining the processed signals to produce a single summation signal corresponding to the sum of the processed signals. The summation signal is divided and filtered in a modem to produce a plurality of channel reference signals with a reduced overall nose level relative to the summation signal. The reference signals are added together in a summer to produce a composite reference signal which is subtracted from the summation signal in a subtractor to produce an error signal. The error signal corresponds to the interference level in the summation signal relative to the composite reference signal. The error signal is applied to each of the adaptive modules as the control signals. The adaptive modules respond to the error signal to null interfering signals received on the antenna elements to enhance signal-to-interference ratios in the summation signal.

BRIEF DESCRIPTION OF THE DRAWINGS

The present invention may best be understood by those of ordinary skill in the art by reference to the following Detailed Description when considered in conjunction with the Drawings in which.

DETAILED DESCRIPTION

Figure 1:
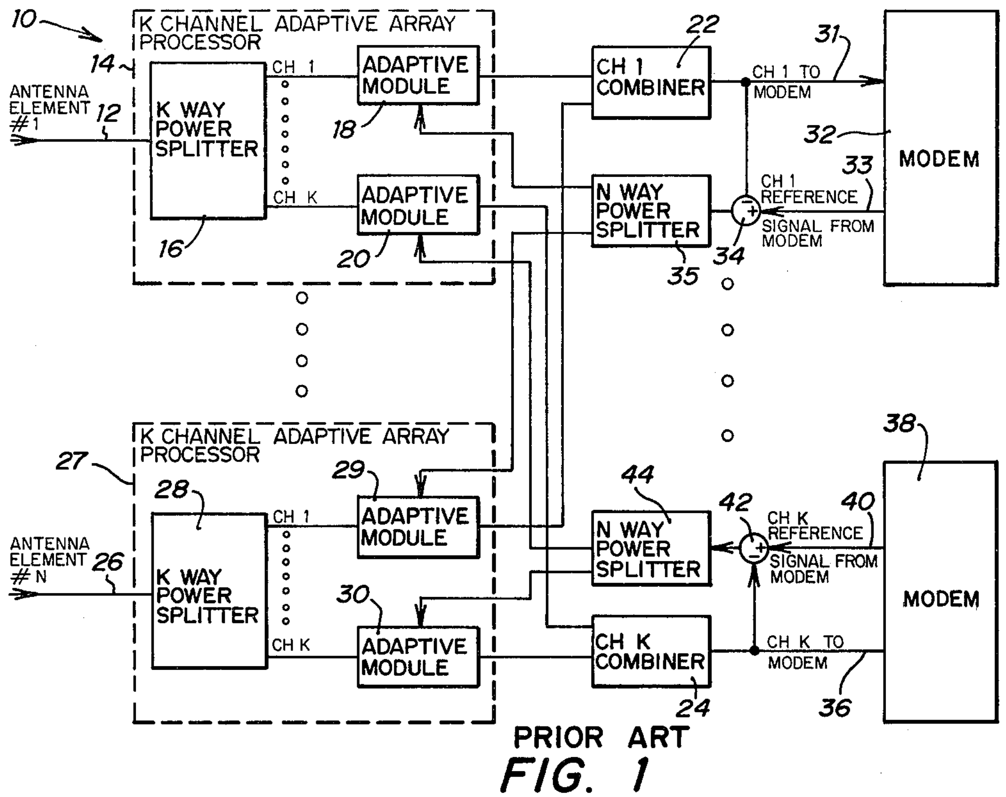
PRIOR ART FIG. 1
FIG. 1 is a diagram illustrating conventional multichannel adaptive array processing typical of the prior art.

Referring now to the drawings in which like reference characters designate like or corresponding parts throughout the several views, there is shown in FIG. 1 a processing circuit 10 typical of conventional mutlichannel adaptive array processing systems. The processing circuit 10 may be used in a communication system having a plurality of channels with an antenna having a plurality of elements. The circuit 10 is shown in FIG. 1 as having N elements and as having K channels. The letters "N" and "K" represent any constant and are used to indicate that circuit 10 symbolically represents an adaptive array processor for any suitable multiple channel communication system utilizing a multiple element antenna.

Circuit 10 includes an input terminal 12 for receiving a signal from the first element of a multiple element antenna. The input terminal 12 is connected to a k channel adaptive processor 14 that includes a K way power splitter 16, a first adaptive module 18 and a Kth adaptive module 20. The signal received from the first element of the antenna is transmitted on terminal 12 to the power splitter 16 where the signal is split into K channels. Adaptive module 18 receives the channel 1 signal and adaptive module 20 receives the channel K signal. Although only two channels, channel 1 and channel K, are shown, it will be understood that channels 1 and K symbolically represent any number of channels.

The adaptive modules 18 and 20 are operable to modify the magnitude and phase of the signals received on the first antenna element to produce processed channel signals. The output of adaptive module 18, a processed channel 1 signal, is applied to a channel 1 combiner 22, while the output of adaptive module 20, a processed channel K signal, is applied to a channel K combiner 24. As will hereinafter be described, the channel 1 combiner 22 receives processed channel 1 signals from each antenna element, while the channel K combiner 24 receives processed channel K signals from the antenna elements.

The signal from antenna element N is processed in the same manner as the signal from antenna element 1. The Nth antenna element signal is received on a terminal 26 of a K channel adaptive processor 27. The terminal 26 transmits the Nth antenna element signal to a K way power splitter 28 where the signal is split into K channels. The first channel signal is applied to an adaptive module 29 and the Kth channel signal is applied to an adaptive module 30. The output of adaptive module 29 is applied to the channel 1 combiner 22, while the output of adaptive module 30 is applied to the channel K combiner 24.

The channel 1 combiner 22 combines the channel 1 signals received from the antenna elements 1 through N to produce a channel 1 summation signal on line 31 that is applied to a modem 32. The modem 32 processes the channel 1 summation signal and returns a channel 1 reference signal on line 33 having a reduced noise level relative to the channel 1 summation signal. A substractor 34 subtracts the channel 1 summation signal on line 31 from the channel 1 reference signal on line 33 to produce a channel 1 error signal at the output of subtractor 34. The channel 1 error signal of subtractor 34 is applied to an N way power splitter 35 that splits the channel 1 error signal into N signals for application to the first channel adaptive modules 18 and 29. In response to the channel 1 error signal, the adaptive modules 18 and 29 are adjusted to null directional interference and channel 2 through K signals and optimize array gain for the channel 1 signal, thereby maximizing the signal-to-interference ratio of the channel 1 summation signal on line 31.

The output of the channel K adaptive modules 20 and 30 are applied to a channel K combiner 24 that produces a channel K summation signal on a line 36. The channel K summation signal is applied to a modem 38 that processes the signal to produce a channel K reference signal on line 40 having a reduced interference level relative to the channel K summation signal. The summation signal on line 36 is subtracted from the reference signal on line 40 by a subtractor 42 to produce a channel K error signal that is applied to an N way power splitter 44. The power splitter 44 divides the K channel error signal into N number of signals and the channel K error signals are applied to the adaptive modules 20 and 30 as a control signal. In response to the K channel error signals, the adaptive modules 20 and 30 adjust to null interference signals and channel 1 through K-1 signals received on the antenna elements and optimize array gain for the channel K signal summation signal on line 36.

Circit 10 described above is conventional. The operation, function and construction of each component of circuit 10 are known.

Although the circuit 10 achieves the desired function of nulling directional interference signals and enhancing gain on desired channel signals, the circuit 10 utilizes an unnecessarily large number of components. In accordance with the present invention, one adaptive module is provided for each antenna element. All of the channel signals from a single antenna element are processed in the single adaptive module, and reference signals are produced for each channel and are summed to provide a single reference signal for controlling all adaptive modules. Thus, the present invention utilizes a summed reference technique of processing the signals from the antenna elements in such manner as to reduce the amount of hardware in the processor of the present invention relative to conventional processors.

Figure 2:
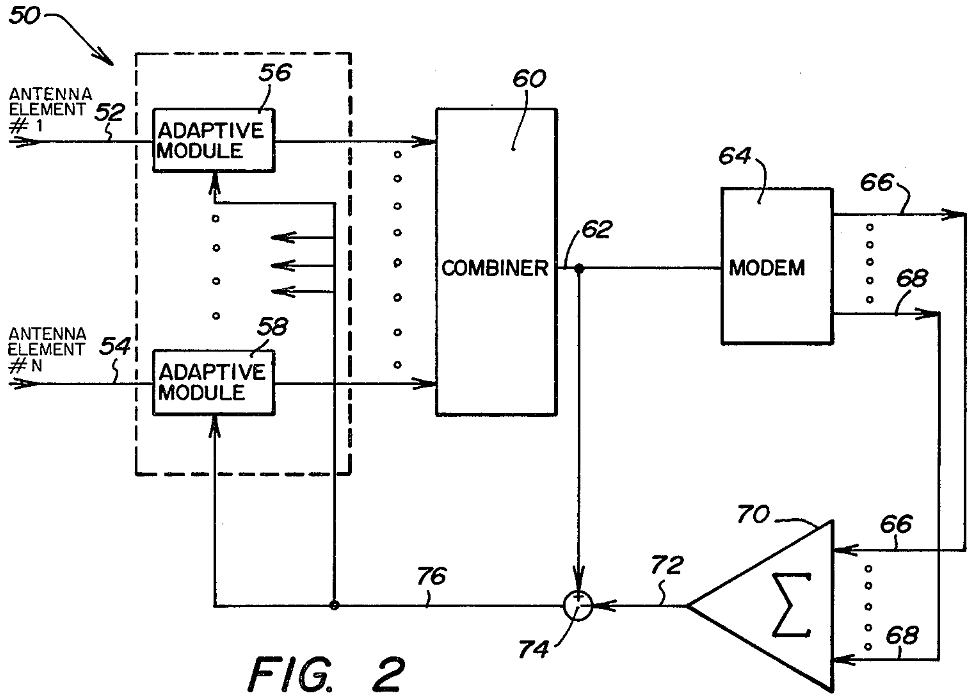
FIG. 2 is a diagram illustrating summed reference adaptive array processing of the present invention for a multi-channel communication system.

Referring now to FIG. 2, there is shown a processing circuit 50 embodying the present invention. As used in the discussion above regarding FIG. 1, the letter N will represent the number of antenna elements, and the letter K will represent the number of signal channels. The processing circuit 50 includes terminals 52 and 54 for receiving signals from antenna elements 1 and N, respectively. The letter N is used to represent any constant to indicate that circuit 50 is a general circuit symbolically representing a circuit for use with any suitable antenna having any plurality of antenna elements. The signal from antenna element 1 is transmitted by terminal 52 to an adaptive module 56, and the signal from antenna element N is transmitted by terminal 54 to an adaptive module 58. The adaptive modules 56 and 58 modify the magnitude and phase of the respective antenna element signals received, and processed signals from the adaptive modules 56 and 58 are transmitted to a combiner 60. Construction of the adaptive modules 56 and 58 using quadrature PIN diode attenuators or double balanced mixers is common practice. The combiner 60 combines the processed signals from each adaptive module 56 and 58 to produce a summation signal on line 62. The combiner 60 can be made from any commercially available power divider, e.g., Merrimac, Anaren, etc. The adaptive modules 56 and 58 are conventional in construction and are analogous in structure and function to the adaptive modules 18, 20, 29 and 30 of the conventional circuit 10 for adaptive array processing as shown in FIG. 1.

A modem 64, such as a receiver, receives the summation signal from line 62 and produces channel 1 through channel K reference signals on lines 66 and 68, respectively. The modem 64 is a special piece of equipment and its design usually varies from application to application. All modems, however, do provide processing gain on the desired signals and can, therefore, be made to generate a reference signal. The design of the reference signal recovery circuit is discussed in the R. T. Compton article previously referenced. In the preferred embodiment, channels 1 through K are code division multiplexed. It will be understood that other types of multiplexing may be used in the present invention, and the modem 64 may be any suitable modem that removes noise or interference signals from the summation signal on line 62.

The channel 1 through channel K reference signals on lines 66 and 68 are applied to a summer 70 to produce a composite reference signal on line 72. The reference signal summer 70 can be made from any summing amplifier or power divider, e.g., Merrimac, PDF series. As a result of the processing accomplished in the modem 64, the composite reference signal on line 72 has a lower interference signal level than the summation signal on line 62. The composite reference signal on line 72 is substracted from the summation signal on line 62 by a subtractor 74 to produce an error signal on line 76. The error signal on line 76 is transmitted and applied to all of the N number of adaptive modules 56 and 58, and in response to this error signal, the adaptive modules 56 and 58 adjust to null directional interference signals and to optimize gain for the signals received from antenna elements 1 through N. In this manner the signal-to-interference ratio of the summation signal on line 62 is maximized.

Referring now to FIGS. 1 and 2, it will be appreciated that the processing circuit 50 of the present invention results in a substantial hardware savings over the conventional processing circuit 10. The processing circuit 50 (FIG. 2) of the present invention requires only one adaptive module per antenna element, whereas the conventional processing circuit 10 (FIG. 1) requires a plurality of adaptive modules for each antenna element according to the number of channels utilized. In circuit 50, the reference signals on lines 66 and 68 are added by the summer 70 to produce a single reference signal which is substracted from a single summation signal. Thus, a single error signal is produced on line 76 for controlling the adaptive modules 56 and 58. In circuit 10, a plurality of reference signals corresponding to the number of channels in the circuit 10 are required to provide a control function for the adaptive modules 18, 20, 29 and 30.

Although a particular embodiment has been described in the foregoing Detailed Description, it will be understood that the present invention is capable of numerous rearrangements, modifications and substitutions of parts without departing from the spirit of the invention. In particular, it is understood that the present invention is capable of application to any suitable multichannel communication system using a multiple element antenna.

I claim:

1. An adaptive array processor for nulling directional interference signals and optimizing gain for received signals for use in a multi-channel communication system having a plurality of antenna elements producing antenna element signals, comprising:

a plurality of adaptive modules, each adaptive module being connected to one of said antenna elements for modifying the magnitude and phase of an antenna element signal to produce a processed signal;

a combiner for combining the processed signals from said adaptive modules to produce a summation signal;

a modem for dividing and processing noise from the summation signal to produce a plurality of channel signals with a reduced overall interference level relative to the summation signal;

summer means for summing the channel signals to produce a composite reference signal having a reduced interference level relative to the summation signal;

subtractor means for subtracting the composite reference signal from the summation signal to produce an error signal which corresponds to the interference level in the summation signal relative to the composite reference signal;

transmission means for applying the error signal to said adaptive modules to perform a control function; and said adaptive modules being responsive to the error signal for modifying the phase and magnitude of the antenna element signals to null interfering signals received on the antenna elements and to enhance the signal-to-interference ratio in the summation signal.

2. An adaptive array processor for nulling interference signals and optimizing gain for received signals in a multi-channel communication system having a plurality of antenna elements each producing an antenna element signal, comprising:

a plurality of adaptive modules connected respectively to said antenna elements, each of said adaptive modules receiving and modifying the magnitude and phase of one of said antenna element signals to produce a processed signal;

means for combining said processed signals from said adaptive modules to produce a summation signal;

means connected to receive said summation signal for producing therefrom a plurality of channel signals each having a reduced interference level relative to said summation signal;

means for summing said channel signals to produce a composite reference signal having a reduced interference level relative to said summation signal;

means for substracting said reference signal from said summation signal to produce an error signal; and means for applying said error signal to said adaptive modules to perform a control function wherein said adaptive modules modify the magnitude and phase of the antenna element signals to null interfering signals received by said antenna elements, thereby enhancing the signal-to-interference ratio of said summation signal.

3. A method for nulling interference signals and optimizing gain for signals received by an antenna having a plurality of antenna elements in a multi-channel communication system, comprising the steps of:

receiving an antenna element signal on each of said antenna elements;

passing each of said antenna element signals through a corresponding adaptive module for modifying the magnitude and phase of the antenna element signal to produce a processed signal;

combining said processed signals from said adaptive modules to produce a summation signal;

producing from said summation signal a plurality of channel signals each having a reduced interference level relative to said summation signal;

summing said channel signals to produce a composite reference signal having a reduced interference level relative to said summation signal;

subtracting said composite reference signal from said summation signal to produce an error signal; and applying said error signal to each of said adaptive modules to perform a control function wherein said adaptive modules modify the magnitude and phase of the antenna element signals passed therethrough to null interfering signals received by said antenna elements thereby enhancing the signal-to-interference ratio of said summation signal.

4. A method for nulling directional interference signals and optimizing gain for received signals in a multichannel communication system having a plurality of antenna elements producing antenna element signals, comprising the steps of:

passing each of said antenna element signals through a corresponding adaptive module for modifying the magnitude and phase of the antenna element signal to produce a processed signal;

combining said processed signals from said adaptive modules to produce a summation signal;

dividing and processing noise from the summation signal to produce a plurality of channel signals with a reduced overall interference level relative to the summation signal;

summing said channel signals to produce a composite reference signal having a reduced interference level relative to said summation signal;

subtracting said composite reference signal from said summation signal to produce an error signal;

applying said error signal to said adaptive modules to perform a control function; and modifying the phase and magnitude of said antenna element signals by operation of said adaptive modules in response to said error signal to null interfering signals received on said antenna elements and to enhance the signal-to-interference ratio of said summation signal.

* * * * *